(12) United States Patent
Ranade et al.

(10) Patent No.: US 9,272,811 B1
(45) Date of Patent: Mar. 1, 2016

(54) TEMPERATURE CONTROLLED PALLET SHIPPER

(71) Applicant: SONOCO DEVELOPMENT, INC, Hartsville, SC (US)

(72) Inventors: Ajit Ranade, Katy, TX (US); Benjamin Philip Goodman, Boulder, CO (US); Iftekhar Ahmed, Pierrefonds (CA); Arthur Samoylovich, Buffalo Grove, IL (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 14/485,272

(22) Filed: Sep. 12, 2014

(51) Int. Cl.
*A47J 39/00* (2006.01)
*B65D 19/00* (2006.01)
*F16B 5/00* (2006.01)

(52) U.S. Cl.
CPC ............ *B65D 19/0095* (2013.01); *F16B 5/002* (2013.01); *F16B 5/0012* (2013.01); *B65D 2519/00298* (2013.01); *B65D 2519/00353* (2013.01)

(58) Field of Classification Search
USPC ....................... 206/386, 600, 524.1
See application file for complete search history.

(56) References Cited

U.S. PATENT DOCUMENTS

| | | | | |
|---|---|---|---|---|
| 2,770,386 | A * | 11/1956 | Mitchell | B65D 11/28 220/4.21 |
| 4,492,153 | A * | 1/1985 | Grabowski | B65D 11/1873 206/508 |
| 5,743,421 | A * | 4/1998 | Gonzalez | B65D 88/528 217/13 |
| 5,924,302 | A | 7/1999 | Derifield | |
| 6,266,972 | B1 * | 7/2001 | Bostic | F25D 3/06 62/371 |
| 7,028,504 | B2 | 4/2006 | Derifield | |
| 7,913,511 | B2 | 3/2011 | Meyer et al. | |
| 7,963,397 | B2 * | 6/2011 | Seagle | B65D 19/18 206/600 |
| 8,464,891 | B2 * | 6/2013 | Pico | B65D 81/3818 220/528 |
| 8,580,369 | B2 | 11/2013 | Emond et al. | |
| 8,763,423 | B2 | 7/2014 | Tattam | |
| 2004/0226309 | A1 * | 11/2004 | Broussard | F25D 11/003 62/236 |
| 2005/0241978 | A1 | 11/2005 | Plue et al. | |
| 2011/0049164 | A1 | 3/2011 | Banks et al. | |
| 2015/0232266 | A1 * | 8/2015 | Ahmed | B65D 88/744 220/592.01 |

* cited by examiner

*Primary Examiner* — Jacob K Ackun
(74) *Attorney, Agent, or Firm* — Miller, Matthias & Hull LLP

(57) ABSTRACT

A thermally insulated pallet shipper is provided for use in any industry where temperature sensitive products are shipped, including the pharmaceutical, hospital and food industries, particularly for shipping payloads by air. The pallet shipper is made from just four individual foam molded structures: a base, a first corner structure, a second corner structure and a lid.

10 Claims, 8 Drawing Sheets

TEMPERATURE CONTROLLED PALLET SHIPPER

FIELD OF THE DISCLOSURE

This disclosure relates to a temperature controlled pallet shipper for shipping temperature sensitive payloads. More particularly, this disclosure relates to a temperature controlled pallet shipper that avoids the disadvantages of prior temperature controlled pallet shippers while affording additional structural and operating advantages.

DESCRIPTION OF THE RELATED ART

Temperature controlled shippers are used to ship perishable materials such as pharmaceuticals, blood and blood products, transplant organs and food products which must be maintained within a certain temperature range. The shipping and transportation of various perishable materials frequently requires that such materials be maintained in a stable temperature range either higher or lower than the ambient temperatures to which the packaging will be exposed. A number of different types of thermally insulated containers have been developed for this purpose. They generally fall into two main categories, active shippers and passive shippers.

Active shippers are those in which the internal temperature is controlled using a battery operated device or electrical power cord. These systems usually are expensive and quite bulky.

Passive shippers are those in which the internal temperature is maintained without any battery or electrical support. Therefore passive pallet shippers typically are used for five to seven days of duration while battery and electric operated shippers maintain payload temperature as long as the power supply is active.

Pallet shippers may be made of variety of materials, and choice of a material depends on manufacturer core competency, material insulation properties and choice of design features. The thermal conductivity (sometimes called "k value") of a material plays a key role. Thermal conductivity is the ability of material to conduct heat, so the lower the k value the better insulation properties. Common materials for making the outer structure of a pallet shipper include polyurethane (PUR), extruded polystyrene foam (XPS), expanded polystyrene foam (EPS) and molded plastic.

The use of most if not all of these passive shippers involve several challenges and problems:

Weight

The majority of passive pallet shippers are transported via air where the weight of the shipper is a critical factor in transportation cost. Depending on the size of pallet shipper, the payload (such as pharmaceuticals) weight can range anywhere from 400 lbs. to 1600 lbs. On top of this, the refrigerant weight can range from 200 lbs. to 1800 lbs. depending on the duration and temperature requirements.

Edge Leaks

Due to their size, pallet shippers are typically made by molding one panel (wall) at a time. The box or outer structure typically is constructed by assembling six walls. Creating a big box with large walls is not easy and can create lot of gaps (edge leaks) between the walls. Edge leaks in general occur when two adjoining walls of material are not completely in contact/flush with one and another and therefore create a visible gap, which creates a path for ambient air to leak into the container. This results in gain or loss of thermal energy by convection into or out of the pallet shipper. The R-value of the system is reduced significantly due to the presence of these leaks.

These leaks have negative impact on insulation properties and effectively reduce duration of a shipper. Simply adding additional thermal insulation to enclosure is of little benefit; the edge gaps must be minimized or eliminated completely in order for the system's R-value to be maintained. Thus designing an edge leak proof box is very desirable.

Manual Labor Requirements

Shipping pallet assembly requires manual labor, typically in the form of one or two people. It is important to keep the assembly process as simple as possible. Adding complexity into the process can create errors (defects) which can result in the loss of millions of dollars of pharmaceuticals.

Transportation Considerations

Some pallet shippers are specially designed to transport pharmaceuticals and other perishable payloads from one continent to other via air. These air cargo pallet shippers, also known as unit load devices (ULDs), generally fall into one of a number of specific categories, including PAG (quarter and half sizes) and PMC (quarter and half sizes).

Requiring couriers to be more gentle or use greater care when handling the pallet shipper is usually beyond the control of the shipper maker or user. By designing a pallet shipper to create a more robust and sturdy structure, the problems associated with transportation and vibration can be mitigated or even eliminated.

The present disclosure is designed to address the problems described above, by describing a pallet shipper that is modular, easily assembled and has superior thermal properties.

BRIEF SUMMARY OF THE DISCLOSURE

The present disclosure relates to an improved temperature controlled pallet shipper that avoids the disadvantages of prior pallet shippers while affording additional structural and operating advantages.

In one aspect the disclosure relates to a pallet shipper for shipping a temperature sensitive payload, the pallet shipper comprising a pallet shipper for shipping a temperature sensitive payload, the pallet shipper 10 comprising a base, two first corner structures and two second corner structures.

The substantially rectangular base comprises a rectangular upper portion and a rectangular lower portion located adjacent to and located under the upper portion. The upper portion has a peripheral ledge extending outward beyond the lower portion. The ledge has an underside that slopes downward toward the lower portion. This slope helps create surface to surface contact between the walls and the base of the pallet shipper. This surface to surface contact creates a tortuous path for heat flow, thus improving the insulation properties of the pallet shipper. Each first corner structure comprises a grooved panel and a first flanged panel orthogonal to the grooved panel. The grooved panel and the first flanged panel are joined along a vertical corner. The grooved panel extends from the vertical corner to a distal grooved edge. The distal grooved edge defines a vertically oriented groove. The first flanged panel extends from the vertical corner to a distal flanged edge and has a first flange extending from the distal flanged edge in a direction away from the vertical corner. Each first corner structure further comprises an inwardly extending L-shaped footer near a bottom edge.

Each second corner structure comprises a tongued panel and a second flanged panel orthogonal to the tongued panel. The tongued panel and the second flanged panel are joined along a vertical corner. The tongued panel extends from the vertical corner to a distal tongued edge. A tongue extends outwardly from the distal tongued edge in a direction away from the vertical corner. The second flanged panel extends from the vertical corner to a distal flanged edge and has a second flange extending from the distal flanged edge in a direction away from the vertical corner. Each second corner structure further comprises an L-shaped footer extending inwardly near the bottom edge.

Each groove is configured to receive a tongue to form a tongue and groove seam. Each first flange is configured to mate with a corresponding second flange to form a convoluted seam.

Each tongue and groove seam and each flanged seam creates a tortuous path which delays or minimizes any thermal transfer across the seam. The footers slide under the base, thus creating another tortuous path to minimize heat transfer.

The pallet shipper has a modular design and can be enlarged from, say, a quarter PMC to a half PMC and from a quarter PAG to a half PAG just by adding a sidewall between the L-shaped corner structures on either side of the pallet shipper.

The modular design is beneficial from both a product cost standpoint and a logistics cost standpoint. For example, a user can stock a quarter PMC part and use it for a half PMC pallet shipper if there is a need. The modular design also helps reduce tooling costs which results in a reduction in product cost.

DETAILED DESCRIPTION OF THE DISCLOSURE

Figure 1:
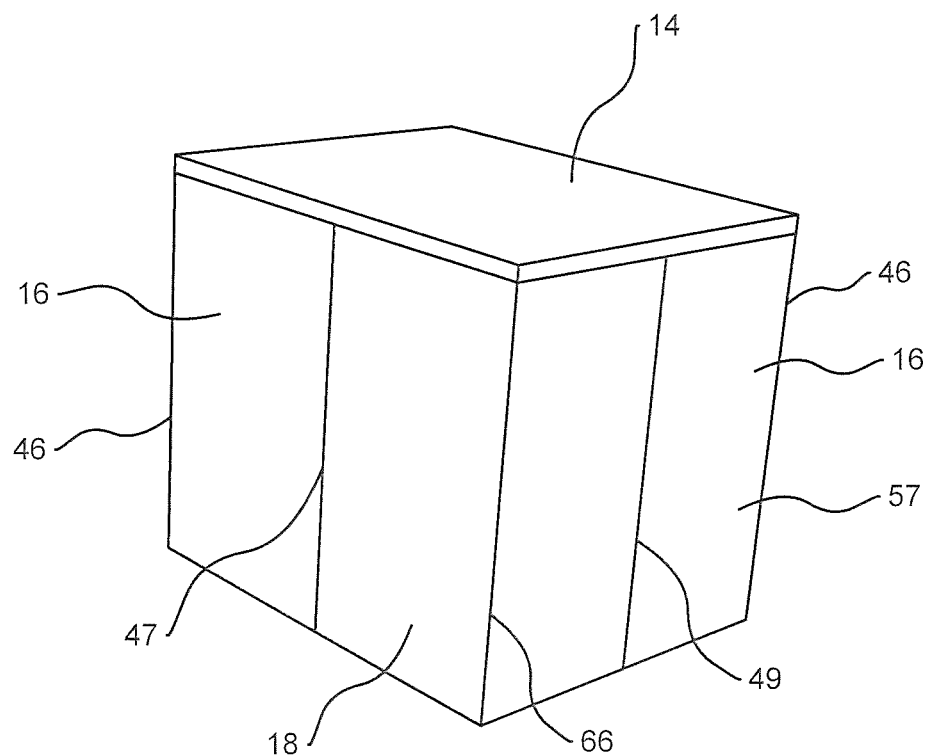
FIG. 1 is a perspective view of a quarter PMC pallet shipper according to the disclosure.

While this disclosure may be embodied in many forms, there is shown in the drawings and will herein be described in detail one or more embodiments with the understanding that this disclosure is to be considered an exemplification of the principles of the disclosure and is not intended to limit the disclosure to the illustrated embodiments.

Figure 2:
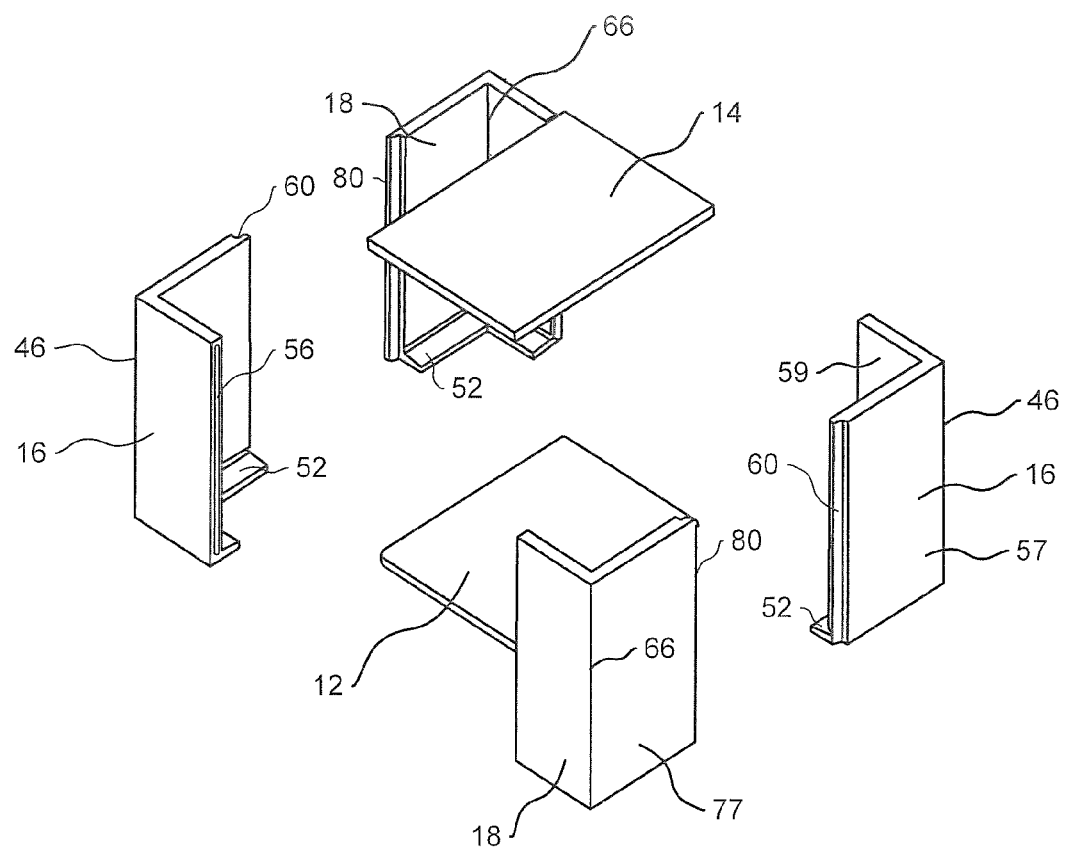
FIG. 2 is an exploded perspective view of the quarter PMC pallet shipper of FIG. 1.

Turning to the drawings, there is shown in FIG. 1 a perspective view of a pallet shipper 10 (a quarter PMC pallet shipper) for shipping a temperature sensitive payload. FIG. 2 is a partially exploded perspective view of the quarter PMC pallet shipper 10 of FIG. 1. The pallet shipper 10 comprises a substantially rectangular base 12, a substantially rectangular lid 14, two substantially L-shaped, unitary, first corner structures 16, and two substantially L-shaped, unitary, second corner structures 18. Significantly, as explained below, there are no seams or other structural discontinuities at the four outer corners 46, 66. Rather, the seams or junctions are located along the sides of the pallet shipper 10 away from the corners 46, 66. The pallet shipper 10 may be made from foamed insulative materials using only four molding tools, one each for the base 12, lid 14, first corner structure 16 and second corner structure 18.

Figure 3:
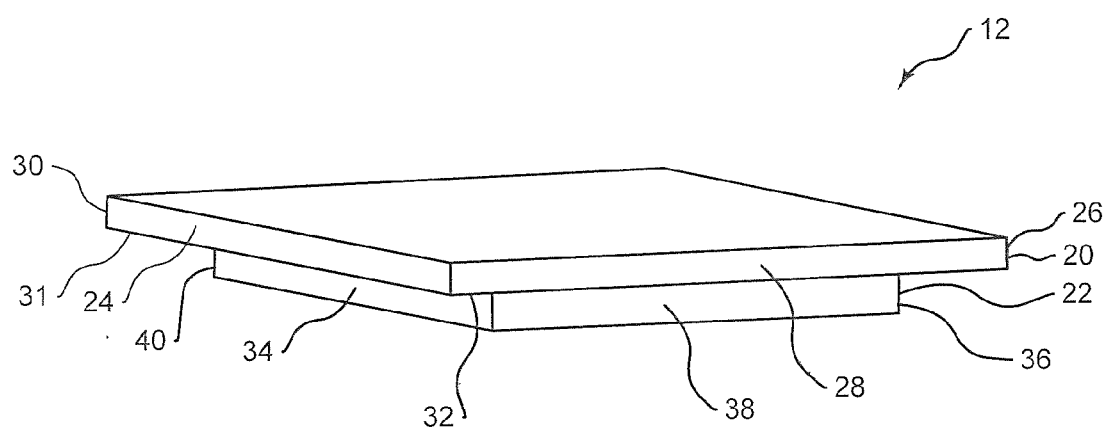
FIG. 3 is a perspective view of a base used in the construction of the quarter PMC pallet shipper of FIG. 1.

FIG. 3 is a perspective view of the base 12 used in the construction of the quarter PMC pallet shipper of FIG. 1. The base 12 comprises a rectangular upper portion 20 and a rectangular lower portion 22 located adjacent to and under the upper portion 20. The upper portion 20 extends from a first side edge 24 to an opposite first side edge 26 and from a first front edge 28 to an opposite first rear edge 30. The upper portion 20 has a first width defined by the first side edges 24, 26 and a first depth defined by the first front edge 28 and the first rear edge 30.

The lower portion 22 extends from a second side edge 34 to an opposite second side edge 36 and from a second front edge 38 to an opposite second rear edge 40. The lower portion 22 has a second width defined by the second side edges 34, 36 and a second depth defined by the second front edge 38 and second rear edge 40. As is apparent from the figure the lower portion width is less than the upper portion width and the lower portion depth is less than the upper portion depth, so the lower portion edges 34, 36, 38, and 40 are recessed with respect to the upper portion edges 24, 26, 28, 30.

The peripheral portion of the upper portion 20 extending beyond the lower portion may be referred to as a ledge 31. As perhaps best shown in FIG. 7, the ledge 31 has an underside 32 that slopes downward toward the lower portion 22.

The lid 14 is substantially rectangular and may be constructed similarly to the base 12. The lid fits over and may form a friction fit with corner structures 16, 18.

Figure 4:
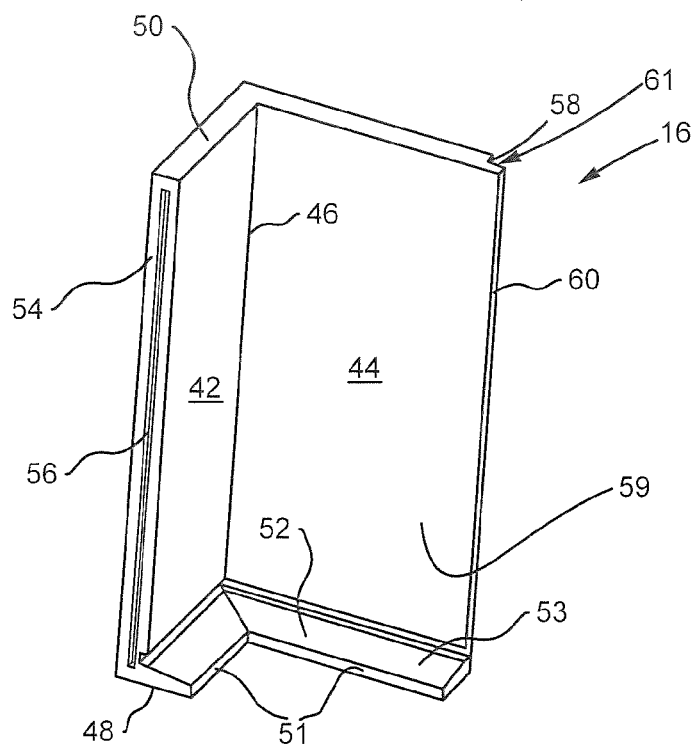
FIG. 4 is a perspective view of a first corner structure used in the construction of the quarter PMC pallet shipper of FIG. 1.

FIG. 4 is a perspective view of a first corner structure 16 used in the construction of the quarter PMC pallet shipper of FIG. 1. Two are used in the construction of the pallet shipper 10 and may be located diagonally opposite each other. Each first corner structure 16 comprises a grooved panel 42 and a flanged panel 44 orthogonal to the grooved panel 42. The grooved panel 42 and the flanged panel 44 are joined along a vertical corner 46 to form a single unitary structure. Each first corner structure 16 extends from a bottom edge 48 to a top edge 50.

The grooved panel 42 extends from the vertical corner 46 to a distal grooved edge 54. The distal grooved edge 54 defines a vertically oriented groove 56. The flanged panel 44 extends from the vertical corner 46 to a distal flanged edge 58. Each first corner structure 16 has an outer surface 57 (FIG. 2) facing away from the payload and an inner surface 59 facing the payload. An inner flange 60, so called because it can be considered an extension of the inner surface 59, extends from the distal flanged edge 58 in a direction away from the vertical corner 46. The flange 60 helps define an outer notch 61 on the outer surface 59 of the flanged panel 44.

Each first corner structure 16 also comprises an L-shaped footer 52 extending inwardly from the grooved panel 42 and the flanged panel 44 near the bottom edge 48 and terminating in an L-shaped distal edge 51. Each footer 52 has an L-shaped top surface 53 that slopes downwardly toward the distal edge 51.

Figure 5:
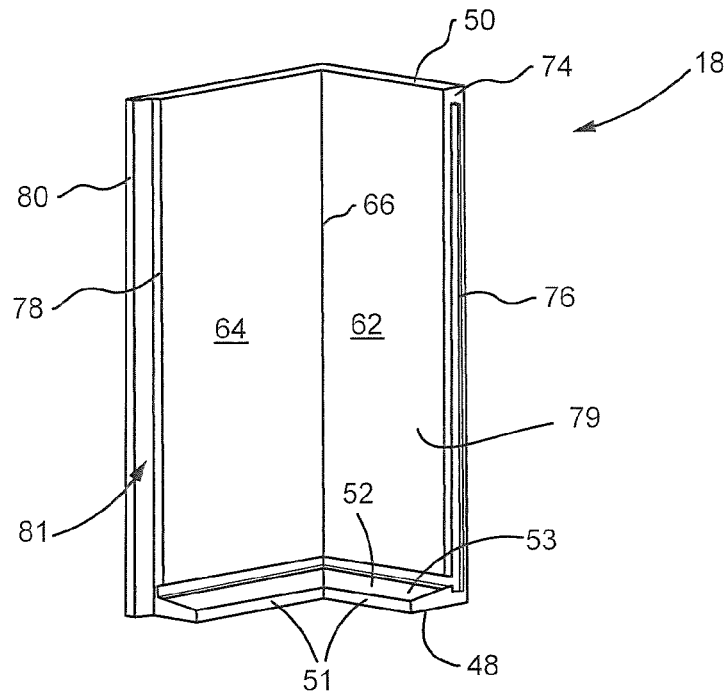
FIG. 5 is a perspective view of a second corner structure used in the construction of the quarter PMC pallet shipper of FIG. 1.

FIG. 5 is a perspective view of a second corner structure 18 used in the construction of the quarter PMC pallet shipper 10 of FIG. 1. As with the first corner structures 16, two second corner structures 18 are used in the construction of the pallet shipper 10 and are located diagonally opposite each other. Each of the two substantially L-shaped, unitary, second corner structures 18 comprises a tongued panel 62 and a flanged panel 64 orthogonal to the tongued panel 62. The tongued panel 62 and the flanged panel 64 are joined along a vertical corner 66. Like the first corner structures 16, each second corner structure 18 extends from a bottom edge 48 to a top edge 50.

The tongued panel 62 extends from the vertical corner 66 to a distal tongued edge 74. A tongue 76 extends outwardly from the distal tongued edge 74 in a direction away from the vertical corner 66. The flanged panel 64 extends from the vertical corner 66 to a distal flanged edge 78. Each corner structure 18 has an outer surface 77 (FIG. 2) and an inner surface 79 facing the payload. An outer flange 80, so called because it can be considered an extension of the outer surface 77, extends from the distal flanged edge 78 in a direction away from the vertical corner 66 and defines an inner notch 81 on the inner surface 79 of the flanged panel 64.

Also like the first corner structures 16, each second corner structure 18 comprises an L-shaped footer 52 extending inwardly from the tongued panel 62 and the flanged panel 64 near the bottom edge 48 and terminating in a distal edge 51. Each footer 52 has an L-shaped top surface 53 that slopes downwardly toward the distal edge 51. Each footer 52 is configured to extend underneath the upper portion 20 of the base 12 and mate with the base 12 in "skin to skin" fashion as explained below with regard to FIG. 7.

Figure 6:
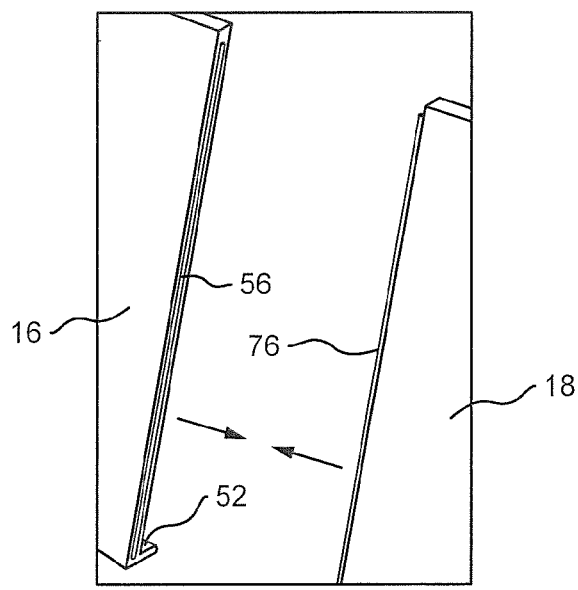
FIG. 6 is a perspective view of a portion of the quarter PMC pallet shipper of FIG. 2.

FIG. 6 is a perspective close up view of a portion of the pallet shipper 10 of FIG. 1 illustrating the tongue and groove method of attaching adjoining corner structures 16, 18. The groove 56 in each first corner structure is configured to receive a tongue 76 in an adjacent second corner structure 18 to form a tongue and groove seam 47.

Figure 7:
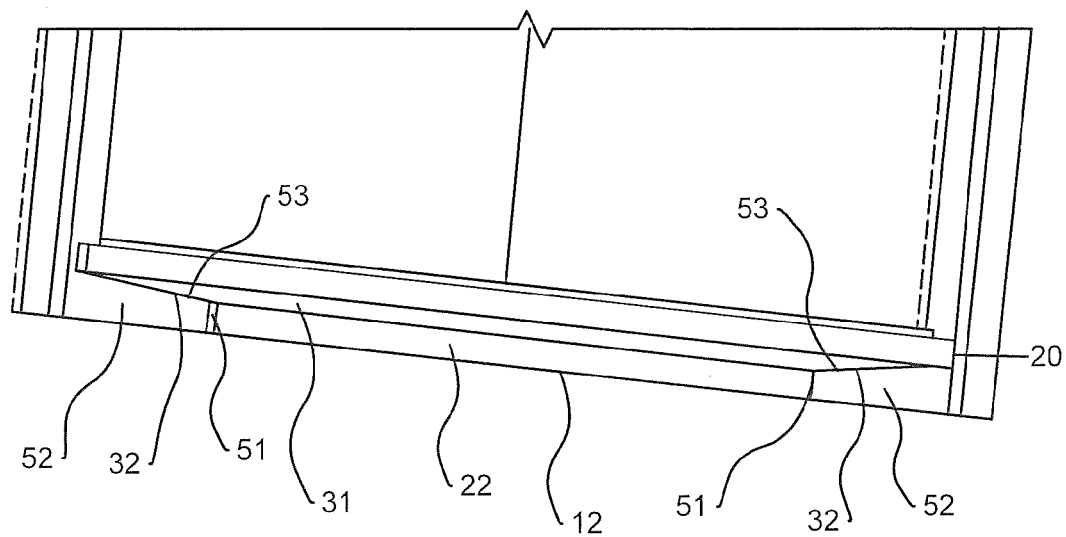
FIG. 7 is a perspective view of a portion of the quarter PMC pallet shipper of FIG. 2.

FIG. 7 is a bottom perspective view of the pallet shipper 10 of FIG. 1, showing how the footers 52 mate with the base 12. Preferably the slope of the footers 52 is equal to the slope of the ledge 31 of the base 12 so that the top surface 53 of each footer 52 mates with (abuts) the underside 32 of the ledge. Also, the length of the footers 52 may be equal to the depth of the ledge 31 so that the distal edge 51 of each footer 52 mates with one of the 34, 36, 38, 40 edges of the lower portion 22 of the base 12.

Figure 8:
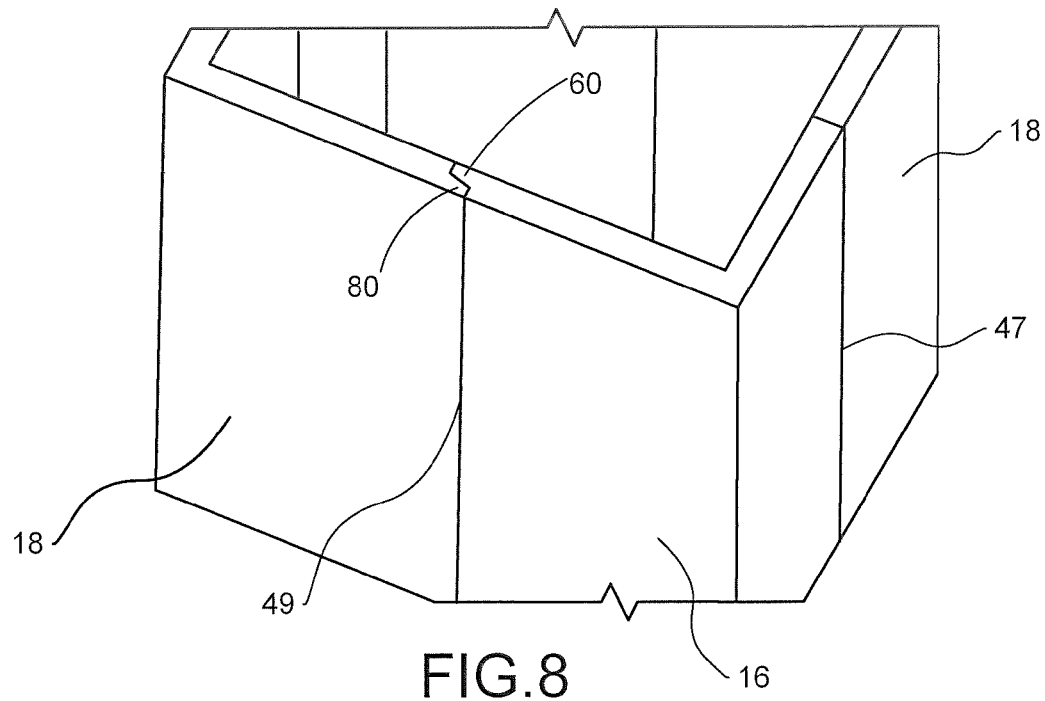
FIG. 8 is a top perspective view of a portion of the quarter PMC pallet shipper of FIG. 1 with the lid removed.
Figure 9:
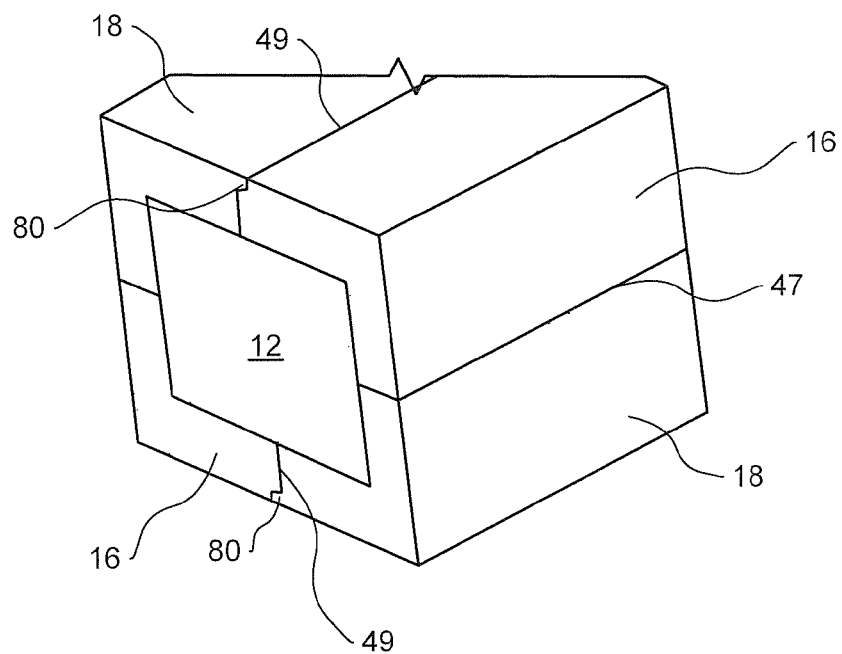
FIG. 9 is a bottom perspective view of the quarter PMC pallet shipper of FIG. 1.

FIG. 8 is a perspective view of a portion of the pallet shipper 10 of FIG. 1 and FIG. 9 is a bottom perspective view of the quarter PMC pallet shipper 10 of FIG. 1, both illustrating the cooperating flange method of attaching adjoining corner structures 16, 18. The inner flange 60 of each first corner structure 16 is configured to mate with a corresponding outer flange 80 of an adjacent second corner structure 18, thereby forming a convoluted "cooperating flange" seam 49 which minimizes or eliminates edge leaks. The convoluted seam or junction presents a tortuous, non-linear path for heat to transfer through the pallet shipper wall.

In the illustrated examples the first corner structure 16 comprises an inner flange 60 and the second corner structure 18 comprises an outer flange 80. However, it should be understood that a reverse configuration is also contemplated in which the first corner structure 16 comprises an outer flange and the second corner structure 18 comprises an inner flange. In either case, the flanges 60, 80 cooperate (join together) to form a convoluted but air tight seal.

Figure 10:
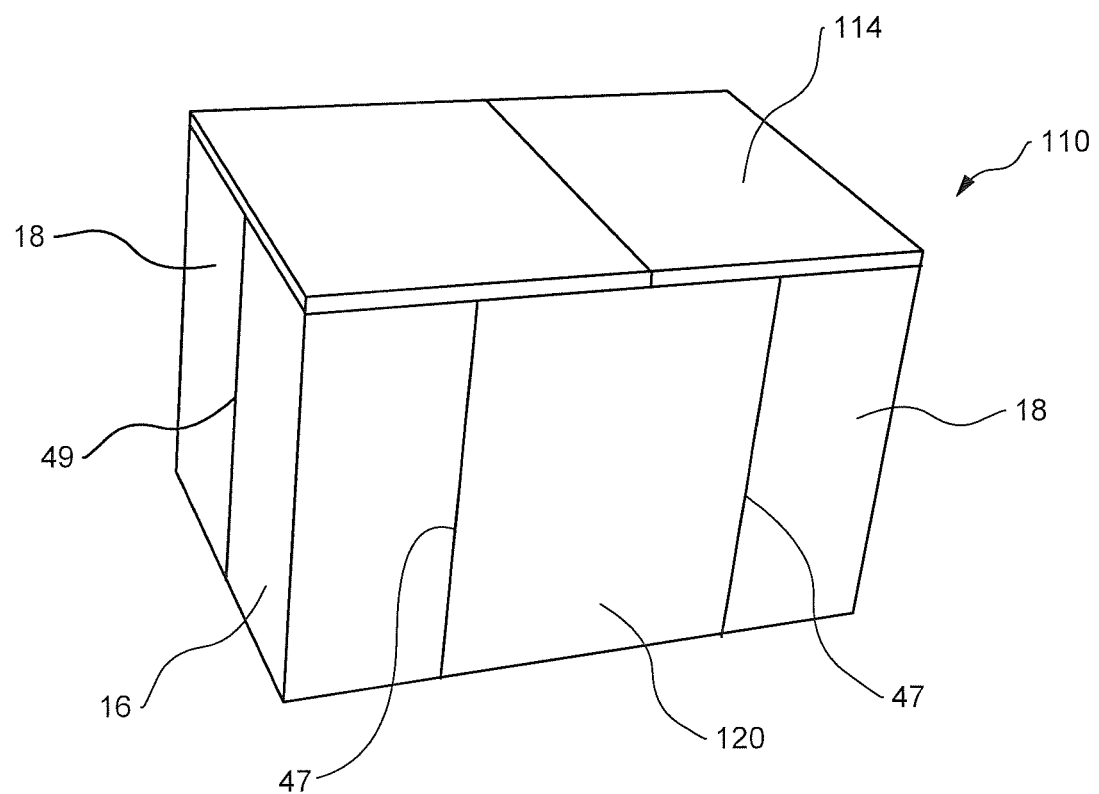
FIG. 10 is a perspective view of a half PMC pallet shipper according to the disclosure.

The pallet shipper described herein is modular in that it can easily be expanded into a larger pallet shipper. FIG. 10 is a perspective view of another, larger embodiment of a pallet shipper 110 according to the disclosure Like the previous embodiment, the pallet shipper 110 comprises a substantially rectangular base 112 (FIG. 11), a substantially rectangular lid 114, two substantially L-shaped, unitary, first corner structures 16 and two substantially L-shaped, unitary, second corner structures 18. The first corner structures 16 and the second corner structures 18 may be identical to that of the earlier embodiment. The base 112 may be a single unitary structure or may comprise two smaller bases 12 fitted together. Likewise, the lid 114 may be a single unitary structure or may comprise two smaller lids 14 fitted together.

Figure 12:
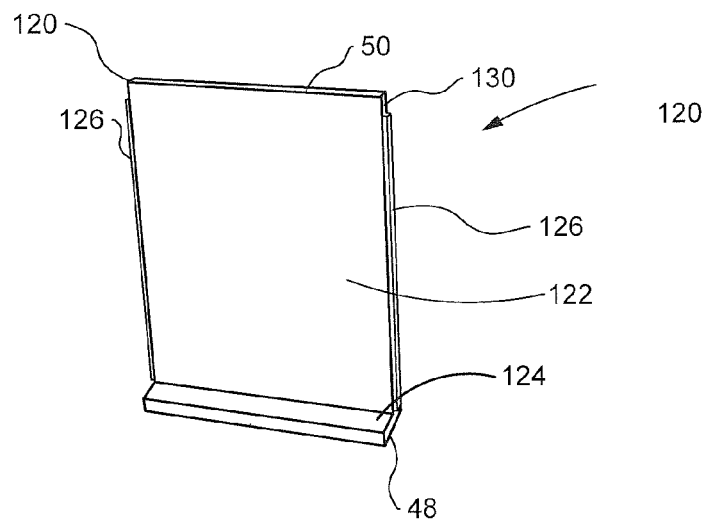
FIG. 12 is a perspective view of a side wall panel used in the construction of the half PMC pallet shipper of FIG. 10.

In addition to the aforementioned components which the large pallet shipper 110 may share in common with the earlier embodiment, the large pallet shipper 110 further comprises two substantially rectangular sidewall panel 120. As best shown in FIG. 12, each sidewall panel 120 comprises a main panel 122, a footer 124 and tongues 126. The main panel 122 extends from a bottom edge 48 to a top edge 50 and from one side edge 130 to an opposite side edge 130. A tongue 126 extends outward from each side edge 130.

Figure 11:
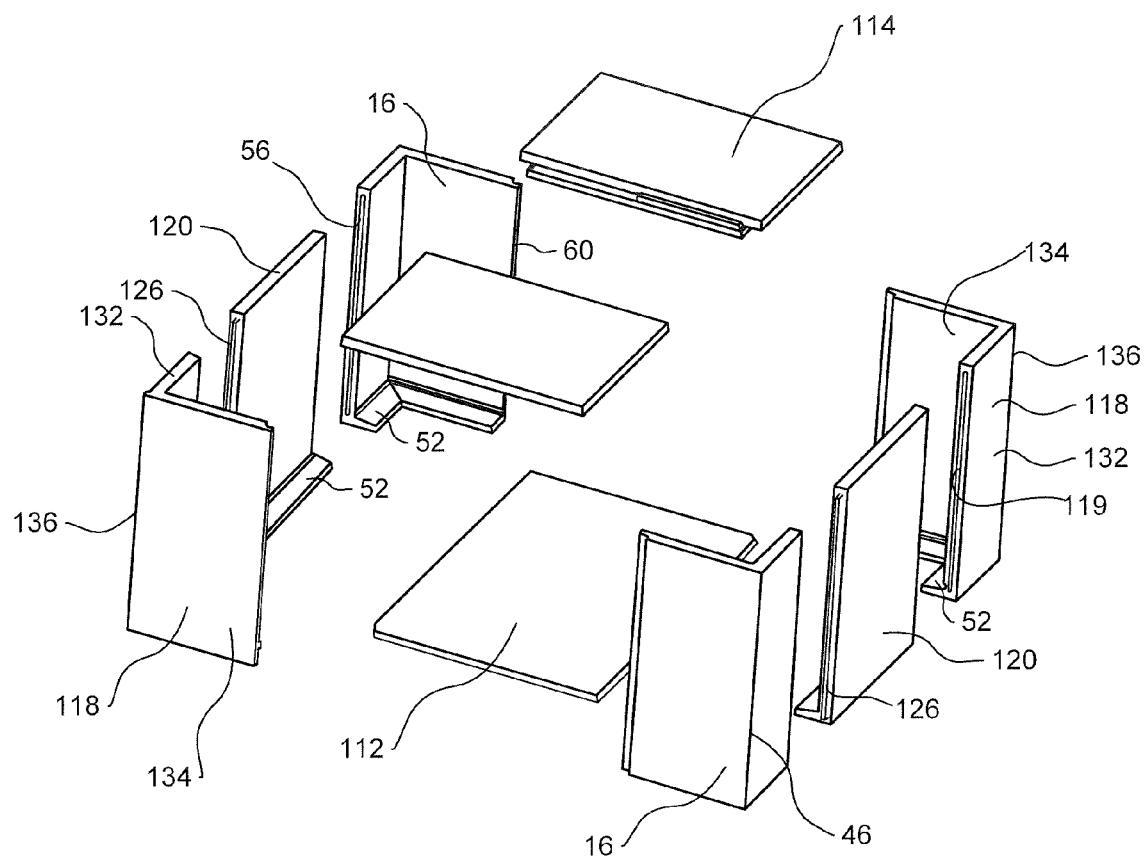
FIG. 11 is an exploded perspective view of the half PMC pallet shipper of FIG. 10.

FIG. 11 is an exploded perspective view of the large pallet shipper 110 of FIG. 10. The large pallet shipper 110 may be made by adding a sidewall panel 120 between two adjacent corner structures 16, 118 on the tongue-in-groove sides of the small pallet shipper 10 (as opposed to the cooperating flange sides).

Since the sidewall 120 has tongues 120 on either side, it is necessary in this embodiment to modify the pallet shipper 10 of FIGS. 1-9. Specifically, the second corner structure 18 must be modified so that its distal (tongued) edge 74 defines a groove 119 for receiving a corresponding tongue 126 of an adjacent sidewall panel 120. This may be accomplished by modifying the tooling used to form the second corner structure 18 so that a modified second corner structure 118 is formed having a groove 119 along one edge. More specifically, the modified second corner structure 118 comprises a grooved panel 132 and a second flanged panel 134 orthogonal to the grooved panel 132 joined along a vertical corner 136. The second flanged panel 134 terminates in a second flange 138 at its distal end. (Alternatively, the sidewall 120 may be formed with a tongued edge and a grooved edge, which would negate the necessity to modify the second corner structures 18.)

In the embodiment shown in FIGS. 10 and 11, one sidewall tongue 126 is inserted into a groove 119 in an adjacent second corner structure 118 and the opposite tongue 126 is inserted into a groove 56 in a first corner structure 16. In this way the short sides of the small pallet shipper 10 become the long sides of the large pallet shipper 110. Because of the footers extending inward from the bottom edge 48 of the sidewall 120, each sidewall 120 is self-standing. Also, a sidewall 120 can be used on either side of the pallet shipper 110.

The pallet shipper 110 may covered with a single large lid or, as shown in FIG. 11, two smaller lids 14.

Figure 13:
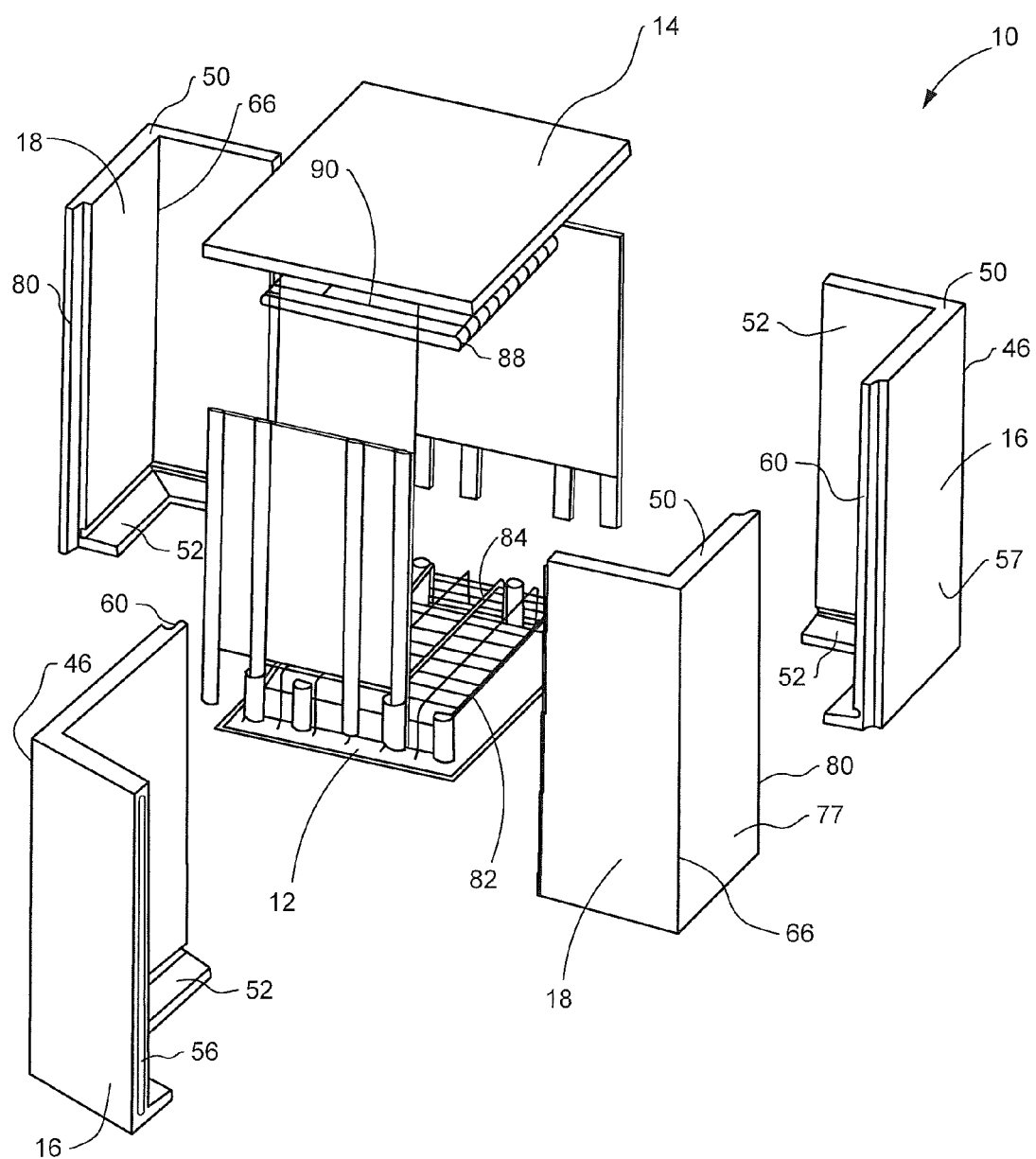
FIG. 13 is an exploded perspective view of a pallet shipper including wire racking according to the disclosure.

FIG. 13 is an exploded partial perspective view of a pallet shipper 10 with wire racks according to another embodiment of the disclosure. In addition to the components described above with regard to FIGS. 1 to 9, the pallet shipper 10 further comprises one or more self-standing bottom wire racks 82 having a payload bearing surface 84 located within the payload section. The pallet shipper 10 may further comprise refrigerants (not shown) located between the bottom wire rack 82 and the base 12.

The pallet shipper 10 may also comprise a top wire rack 88 having a refrigerant bearing surface 90 located within the payload section. Refrigerants (not shown) may be placed between the top wire rack 88 and the lid 14.

INDUSTRIAL APPLICABILITY

The thermally insulated pallet shipper may be used in any industry where temperature sensitive products are shipped, including but not limited to the pharmaceutical, hospital and food industries, particularly for shipping payloads by air.

The pallet shipper may be made in any suitable size, including the following industry recognized sizes:

| Size | Dimensions |
| --- | --- |
| PMC - quarter | 61.5" × 47" |
| PMC - half | 61.5" × 94" |
| PAG - quarter | 61.5" × 44" |
| PAG - half | 61.5" × 88" |
| European Union (E.U.) | 47" × 39" |
| U.S. | 48" × 40" |

The pallet shipper may be any suitable height, but typically is 64" or less including all the outer accessories (skid, trays, plastic wrap etc.).

The pallet shipper components may be made of any suitable materials, but preferably are made from polymeric foam materials, including Neopor, ARCEL, EPS, EPP, XPS, PUR and other thermoplastic and thermoset foam materials.

The pallet shipper has no spit edges. The L shapes corner structures completely eliminate edges and therefore the pallet shipper has no edge leaks.

The "split edges" in the present pallet shipper are moved towards center of each sidewall. The tongue and grove feature creates a tortuous path to reduce heat loss. The tongue and grove feature also creates a locking mechanism for the walls. The center of each wall may also be protected from the inside using refrigerants by lining up refrigerants against the interior walls.

The pallet shipper is easy to assemble and has self-standing wall feature. All the walls are self-supporting which speeds up the assembly process. Due to the self-standing feature the entire shipper 10, 110 can be assembled by one person. Due to the self-standing wall features, there can be no mix up between the left walls and right walls, which can speed up shipper assembly, thus minimizing the time any refrigerants are exposed to room temperature Creating a tortuous path at each tongue and groove seam or junction and at each flanged seam or junction delays any loss of heat. The disclosed pallet shipper 10, 110 has L-shapes corner structures 16, 18 where the footer 52 of the wall slides under the base 12, thus creating another long tortuous path to minimize heat transfer.

The pallet shipper 10, 110 has a modular design where a small pallet shipper 10 can be extended from, say, a quarter PMC to a half PMC and from a quarter PAG to a half PAG by just adding one extra sidewall 120 between 2 L-shaped corner structures 16, 18. This modular design has many advantages:
1. Reduction in tooling cost. Adding on extra panel 120 requires just one extra tool compared to building entire set with six different new tools.
2. Reduction in tooling cost results in an overall cost reduction for the final product.
3. Customers can also interchange parts between the same family (PMC and PAG) of shippers for better logistics.
4. Maintain overall ease of assembly. Customer doesn't have to change any assembly process.

The pallet shipper may achieve a 37% weight reduction when compared material to material:

| Half PMC | 92 lbs. in EPS | 148 lbs. in sleeved PUR |
| Quarter PMC | 56 lbs. in EPS | 89 lbs. in sleeved PUR |

It is understood that the embodiments of the disclosure described above are only particular examples which serve to illustrate the principles of the disclosure. Modifications and alternative embodiments of the disclosure are contemplated which do not depart from the scope of the disclosure as defined by the foregoing teachings and appended claims. It is intended that the claims cover all such modifications and alternative embodiments that fall within their scope.

What is claimed is:

1. A pallet shipper for shipping a temperature sensitive payload, the pallet shipper comprising:
    a substantially rectangular base comprising a rectangular upper portion and a rectangular lower portion located adjacent to and located under the upper portion, the upper portion having a peripheral ledge extending outward beyond the lower portion, the ledge having an underside that slopes downward toward the lower portion;
    two substantially L-shaped, unitary, first corner structures, each first corner structure comprising a grooved panel and a first flanged panel orthogonal to the grooved panel, the grooved panel and the first flanged panel joined along a vertical corner, the first corner structure comprising an inwardly extending L-shaped footer near a bottom edge, the grooved panel extending from the vertical corner to a distal grooved edge, the distal grooved edge defining a vertically oriented groove, the first flanged panel extending from the vertical corner to a distal flanged edge and having a first flange extending from the distal flanged edge in a direction away from the vertical corner; and
    two substantially L-shaped, unitary, second corner structures, each comprising a tongued panel and a second flanged panel orthogonal to the tongued panel, the tongued panel and the second flanged panel joined along a vertical corner, each second corner structure extending from a bottom edge to a top edge, each second corner structure comprising an L-shaped footer extending inwardly from the tongued panel and the flanged panel near the bottom edge, the tongued panel extending from the vertical corner to a distal tongued edge, a tongue extending outwardly from the distal tongued edge in a direction away from the vertical corner, the second flanged panel extending from the vertical corner to a distal flanged edge and having a second flange extending from the distal flanged edge in a direction away from the vertical corner; wherein
    each groove is configured to receive a tongue to form a tongue and groove seam; and
    each first flange is configured to mate with a corresponding second flange to form a convoluted seam.

2. The pallet shipper of claim 1 wherein:
    each footer has a distal edge and slopes downward toward the distal edge; and each footer is configured to extend underneath the ledge and mate with the base.

3. The pallet shipper of claim 2 wherein:
each footer is configured to abut the lower portion of the base and the underside of the ledge.

4. The pallet shipper of claim 1 wherein:
the first flanged panel has an outer surface facing away from the payload and the first flange defines an outer notch on the outer surface of the flanged panel; and
the second flanged panel has an inner surface facing the payload and the second flange extends from the distal flanged edge in a direction away from the vertical corner and defines an inner notch on the inner surface of the flanged panel.

5. The pallet shipper of claim 1 further comprising:
a self-standing bottom wire racks having a payload bearing surface located within a payload section of the pallet shipper.

6. The pallet shipper of claim 5 further comprising:
refrigerants located between the bottom wire rack and the base.

7. The pallet shipper of claim 5 further comprising:
a top wire rack located within the payload section and having a refrigerant bearing surface.

8. The pallet shipper of claim 7 further comprising:
refrigerants located between the top wire rack and the lid.

9. The pallet shipper of claim 1 wherein:
the base, first corner structures and second corner structures are made of insulating foam material.

10. A large pallet shipper for shipping a temperature sensitive payload, the pallet shipper comprising:
a substantially rectangular base comprising a rectangular upper portion and a rectangular lower portion located adjacent to and located under the upper portion, the upper portion having a peripheral ledge extending outward beyond the lower portion, the ledge having an underside that slopes downward toward the lower portion;
two substantially L-shaped, unitary, first corner structures, each first corner structure comprising a grooved panel and a first flanged panel orthogonal to the grooved panel, the grooved panel and the first flanged panel joined along a vertical corner, the first corner structure comprising an inwardly extending L-shaped footer near a bottom edge, the grooved panel extending from the vertical corner to a distal grooved edge, the distal grooved edge defining a vertically oriented groove, the first flanged panel extending from the vertical corner to a distal flanged edge and having a first flange extending from the distal flanged edge in a direction away from the vertical corner;
two substantially L-shaped, unitary, second corner structures, each comprising a grooved panel and a second flanged panel orthogonal to the grooved panel joined along a vertical corner, each second flanged panel having a second flange at a distal end; and
two substantially rectangular sidewall panels, each sidewall panel located between adjacent corner structures each sidewall panel comprising a main panel having side edges, a footer and a sidewall tongue extending outward from each side edge; wherein
each groove is configured to receive a sidewall tongue to form a tongue and groove seam; and
each first flange is configured to mate with a corresponding second flange to form a convoluted seam.

* * * * *